United States Patent
Vauchel et al.

(10) Patent No.: US 8,820,344 B2
(45) Date of Patent: Sep. 2, 2014

(54) TURBOJET ENGINE NACELLE

(75) Inventors: Guy Bernard Vauchel, Harfleur (FR); Stephane Beilliard, Toulouse (FR)

(73) Assignee: Aircelle, Gonfreville l'Orcher (FR)

( * ) Notice: Subject to any disclaimer, the term of this patent is extended or adjusted under 35 U.S.C. 154(b) by 629 days.

(21) Appl. No.: 13/145,705

(22) PCT Filed: Feb. 1, 2010

(86) PCT No.: PCT/FR2010/050154
§ 371 (c)(1), (2), (4) Date: Aug. 11, 2011

(87) PCT Pub. No.: WO2010/089498
PCT Pub. Date: Aug. 12, 2010

(65) Prior Publication Data
US 2011/0284095 A1   Nov. 24, 2011

(30) Foreign Application Priority Data
Feb. 4, 2009  (FR) ...................................... 09 50685

(51) Int. Cl.
*F02C 7/042* (2006.01)
*B64D 29/06* (2006.01)
*F02C 7/04* (2006.01)
*B64D 33/02* (2006.01)

(52) U.S. Cl.
CPC ........... *F02C 7/04* (2013.01); *B64D 2033/0286* (2013.01); *B64D 29/06* (2013.01); *F05D 2250/41* (2013.01); *F05D 2240/14* (2013.01); *Y02T 50/671* (2013.01); *B64D 33/02* (2013.01)
USPC ............. 137/15.2; 137/15.1; 60/796; 244/54; 244/53 B (58) Field of Classification Search
CPC ............. F02C 7/04; F02C 7/042; F02C 7/057
USPC ............. 60/796–799; 137/15.1–15.2; 244/54, 244/53 B
See application file for complete search history.

(56) References Cited

U.S. PATENT DOCUMENTS 3,763,874 A * 10/1973 Wilde et al. .................. 137/15.1
5,000,399 A * 3/1991 Readnour et al. ........... 244/53 B

FOREIGN PATENT DOCUMENTS

| BE | 425257 A | 1/1938 |
| DE | 2642523 A1 | 3/1978 |

(Continued)

OTHER PUBLICATIONS

International Search Report issued Oct. 15, 2010 by European Patent Office re PCT/FR2010/050154.

*Primary Examiner* — Andrew Nguyen
(74) *Attorney, Agent, or Firm* — Brinks Gilson & Lione (57) ABSTRACT

The invention relates to a turbojet engine nacelle (1) comprising: an outer structure including an annular lip defining an air inlet and a cowl (9) extending as a continuation of the annular lip, and an inner fixed structure (19) extending as a continuation of the air inlet and including a region equipped with at least one piece of equipment requiring maintenance or monitoring. The aforementioned outer structure can move in relation to the inner structure between an operating position in which the cowl (9) covers the region equipped with the equipment and a maintenance position in which the cowl (9) reveals said region so as to allow access to the equipment from outside. In addition, the outer structure is equipped with at least one reinforcing beam (10) designed to transmit loads between the annular lip (7) and the cowl (9), said beam (10) extending in the radial plane (P) of the air inlet from the outer structure towards the inner structure and comprising guide means (17) capable of co-operating with complementary guide means (23) belonging to the inner structure. The guide means (17) of the beam (10) and the complementary guide means (23) of the inner structure are offset with respect to the radial plane (P) in which the beam (10) extends.

10 Claims, 5 Drawing Sheets

(56) References Cited

FOREIGN PATENT DOCUMENTS

| | | | |
|---|---|---|---|
| FR | 2757823 | A1 | 7/1998 |
| FR | 2906568 | A1 | 4/2008 |
| FR | 2927609 | A1 | 8/2009 |
| GB | 2274490 | A | 7/1994 |

* cited by examiner

TURBOJET ENGINE NACELLE

TECHNICAL FIELD

The invention relates to a turbojet engine nacelle.

BACKGROUND

In general, a turbojet engine nacelle comprises an air intake structure, a middle section and a downstream section. The term "downstream" here refers to the direction corresponding to the direction of the cold air flow penetrating the turbojet engine. The term "upstream" designates the opposite direction.

The air intake structure is situated upstream of the turbojet engine serving to propel the aircraft and includes a so-called laminar mobile cowl frequently designated by LFC ("Laminar Forward Cowl"). Downstream of the air intake structure, the middle structure is intended to surround a fan of the turbojet engine. Still further downstream is the downstream section generally housing thrust reverser means intended to surround the combustion chamber of the turbojet engine. The nacelle ends with a jet nozzle whereof the output is situated downstream of the turbojet engine.

The air intake structure comprises, on the one hand, an air intake lip and, on the other hand, a downstream structure on which the lip is attached. The air intake lip is adapted to allow optimal collection towards the turbojet engine of the air needed to supply the fan and internal compressors of the turbojet engine. The downstream structure is intended to suitably channel air towards the vanes of the fan. This downstream structure generally has an outer panel or cowl and an inner panel. The inner panel has an acoustic shroud making it possible to attenuate the noises created by the turbojet engine as well as the vibrations of the structures.

A majority of equipment such as the accessory gear box (AGB) can be mounted on a turbojet engine body, situated downstream of a case belonging to the middle structure and intended to surround the fan of the turbojet engine. A minority of equipment is mounted around the aforementioned fan case, such equipment being able to be mounted around the aforementioned fan case, such equipment for example being able to be electronic housings or an oil reservoir. The latter are arranged at the downstream end of the fan case, more precisely on an intermediate case dimensioned to support such equipment.

A frequent maintenance operation consists of filling the aforementioned oil reservoir.

To that end, it is known to provide a viewing port and an access hatch to the oil reservoir. The placement of such a hatch decreases the strength of the nacelle structure and increases the cost thereof.

Furthermore, to replace part of the internal equipment, it is generally necessary to place the entire air intake structure. This so-called placement operation consists of removing the air intake structure from the rest of the nacelle. To that end, it is necessary for the nacelle to be equipped with a system allowing the mobility of the air intake structure. Such a deposition requires heavy and substantial tools, and requires that the propulsion assembly and therefore generally the airplane be immobilized.

Document FR 08-00845 in the Applicant's name describes a system allowing such mobility.

More particularly, this document describes a turbojet engine nacelle comprising an outer structure including an annular lip defining an air inlet and a cowl extending as a continuation of the annular lip, and an inner fixed structure extending as a continuation of the air inlet and including a region equipped with at least one piece of equipment requiring maintenance or monitoring, the outer structure being able to move in relation to the inner structure between an operating position in which the cowl covers the region equipped with the equipment and a maintenance position in which the cowl reveals said region so as to allow access to the equipment from outside, the outer structure being equipped with at least one reinforcing beam designed to transmit loads between the annular lip and the cowl, said beam extending in the radial plane of the air inlet from the outer structure towards the inner structure and comprising guide means capable of co-operating with complementary guide means belonging to the inner structure.

The complementary guide means are formed by rails cooperating with guide members mounted on the beams. Each rail is mounted under the beam and extending along the longitudinal axis of the nacelle. Openings or recesses allowing the passage of the rails are formed in the beams, at the points of intersection between each rail and the corresponding beam.

Such recesses or openings weaken the strength of the beams, also called inertia.

It will be recalled that each beam extends along the longitudinal direction of the nacelle, but also along a radial direction, i.e. towards the center of the nacelle, ideally as close as possible to the fan case. However, the rails, the guide members and the fittings making it possible to fasten these components are housed between the beams and the fan case, which limits the dimensions of the beams along the corresponding radial plane.

Thus, the rigidity of the beams is also limited, the latter depending directly on the dimension of the beams along the aforementioned radial plane.

BRIEF SUMMARY

The invention aims to resolve these drawbacks in whole or in part, by proposing a nacelle capable of withstanding high mechanical stresses, while simply and inexpensively performing the aforementioned function of mobility of the air intake structure and while allowing access to the equipment arranged on the internal structure for maintenance purposes.

To that end, the invention relates to a turbojet engine nacelle comprising an outer structure including an annular lip defining an air inlet and a cowl extending as a continuation of the annular lip, an inner fixed structure extending as a continuation of the air inlet and including a region equipped with at least one piece of equipment requiring maintenance or monitoring, the outer structure being able to move in relation to the inner structure between an operating position in which the cowl covers the region equipped with the equipment and a maintenance position in which the cowl reveals said region so as to allow access to the equipment from outside, the outer structure being equipped with at least one reinforcing beam designed to transmit loads between the annular lip and the cowl, said beam extending in the radial plane of the air inlet from the outer structure towards the inner structure, the beam comprising guide means capable of co-operating with complementary guide means belonging to the inner structure, characterized in that the guide means of the beam and the complementary guide means of the inner structure are offset relative to the radial continuation plane of the beam.

The offset of the guide means and the complementary guide means outside the radial plane makes it possible to be able to maximally extend the dimensions of the beam, i.e. so that the inner end of the beam, facing the center of the nacelle, is situated near the inner structure. The increase in the dimensions of the beam along the radial plane then increases the strength of the latter.

Furthermore, it is then no longer necessary to provide openings or recesses in the beams since any interference between the guide means or the complementary guide means and the corresponding beam is avoided. This also results in increasing the strength of the beam.

According to one feature of the invention, the inner structure includes a shroud, a case intended to surround a turbojet engine fan and arranged downstream of the shroud, as well as an intermediate case mounted downstream of the fan case, the intermediate case being provided with the equipment, for example an oil reservoir.

The intermediate case can then be dimensioned independently from the rest of the inner structure, for example independently of the fan case of the shroud, so that it correctly performs its support function for the equipment.

Advantageously, the guide means and the complementary guide means respectively include at least one rail and at least one roller.

It should be noted that the rail, aside from its guide function, also performs a reinforcing function. The placement of the rail on the beam therefore forms a coherent assembly intended for strengthening.

According to one possibility of the invention, the complementary guide means includes at least one generally bobbin-shaped roller, defining a hollow and generally V-shaped contact surface, the guide means including at least one rail inserted, at least in part, in the hollow formed by the contact surface.

It should be noted that the shape of the rail can be incorporated into the beam.

The assembly between the rail and the roller can be provided with or without play. The assembly with play makes it easier to place the mobile structure, for example after placement of the latter, since the positioning tolerances between the fixed structure and the mobile structure during assembly are then greater.

Preferably, at least one beam has a substantially omega-shaped section, forming first and second side walls attached to the outer structure and an end facing the inner structure, arranged in the radial continuation plane of the beam.

The omega-shaped structure offers increased strength for a low weight and bulk.

According to one feature of the invention, the guide means is mounted on one of the first and second side walls of the beam.

Advantageously, at least one beam has a box-shaped structure.

The box-shaped structure makes it possible to limit the weight of the beam while offering significant strength thereof.

According to one possibility of the invention, the nacelle includes at least first and second guide means or complementary guide means, spaced apart from each other along the longitudinal axis of the air inlet.

The spacing can thus be defined so that a tilting of the mobile outer structure under the effect of its weight is prevented during the transition from the operating position to the maintenance position.

Preferably, the outer structure includes a stop intended to cooperate with a complementary stop of the inner structure in the maintenance position, so as to limit the movement of the outer structure relative to the inner structure.

The travel of the mobile outer structure can thus be limited so that it can only go from its operating position to its maintenance position. Any risk of tilting is thereby avoided. The stop can, however, be disassemblable so as to be able to perform the placement operation.

The stop can be formed either by a fitting provided to that end, or directly by part of the complementary guide means.

According to one embodiment of the invention, the stop is equipped with a hook, intended to engage with a retaining member mounted on the inner structure, in the maintenance position of the outer structure, so as to prevent the outer structure from tilting.

The hook thus also makes it possible to avoid any tilting phenomenon in the maintenance position of the mobile outer structure.

The retaining member can be formed again by an independent member fixed on the inner structure or by part of the complementary guide means.

BRIEF DESCRIPTION OF THE DRAWINGS

The invention will be better understood upon reading the following non-limiting description, done in reference to the appended figures.

DETAILED DESCRIPTION

Figure 1:
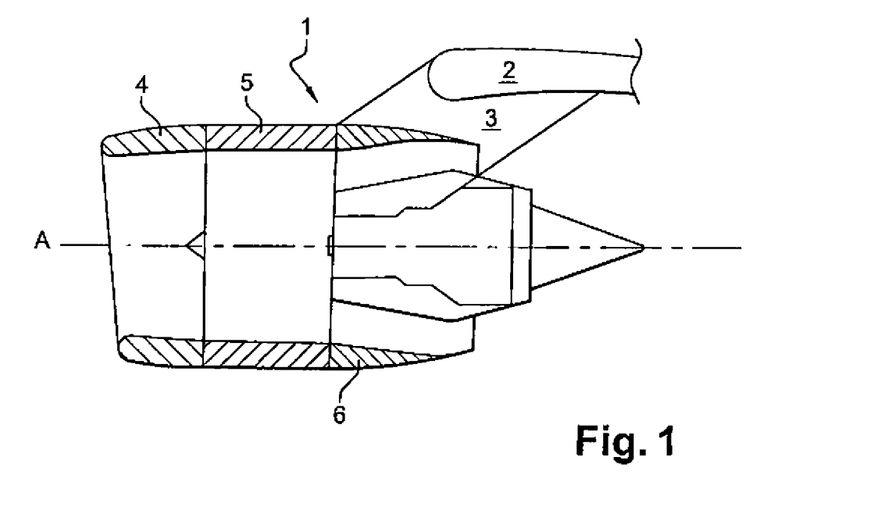
FIG. 1 is a diagrammatic view, in longitudinal cross-section, of the nacelle according to the invention.

A nacelle 1 according to the invention as shown in FIG. 1 constitutes a tubular housing for a turbojet engine (not shown) whereof it serves to channel the flows of air it generates by defining inner and outer stream lines needed to obtain optimal performance. It also houses various components required for the operation of the turbojet engine as well as related systems, such as a thrust reverser.

The nacelle 1 is intended to be connected to a fixed structure of an airplane, such as a wing 2, via a pylon 3.

More precisely, the nacelle 1 has a structure comprising an upstream air intake structure 4, a middle structure 5 surrounding a fan (not visible) of the turbojet engine, and a downstream section 6 surrounding the turbojet engine and generally housing thrust reverser system (not shown).

The air intake structure 4 is divided into two regions. The first region is an annular intake lip 7, adapted to allow optimal collection towards the turbojet engine of the air needed to supply the fan and inner compressors of the turbojet engine. The lip 7 has a downstream inner edge 8 forming a rim.

The second region is a section situated further downstream than the inlet lip comprising at least one outer panel or cowl 9. According to the invention, the lip 7 is incorporated into the outer cowl 9 so as to form a single disassemblable piece.

The outer cowl 9 and the lip 7 form, at least in part, the outer structure. The latter is equipped with beams 10 designed to transmit forces between the annular lip 7 and the outer cowl 9. The latter includes a first part 11 extending under the outer cowl and a second part 12, forming a hook facing the inside of the nacelle, whereof the end 13 bears against the rim 8 formed by the downstream inner edge 8 of the lip 7.

The beam 10 thus extends on the one hand along the axis A of the nacelle and, on the other hand, in the corresponding radial plane P.

Each beam 10 has a box- or omega-shaped structure, defining first and second lateral branches 14, 15 each fixed, at an outer end, to the outer cowl 9 and connected to each other, at an inner end, by an end wall 16.

Figure 2:
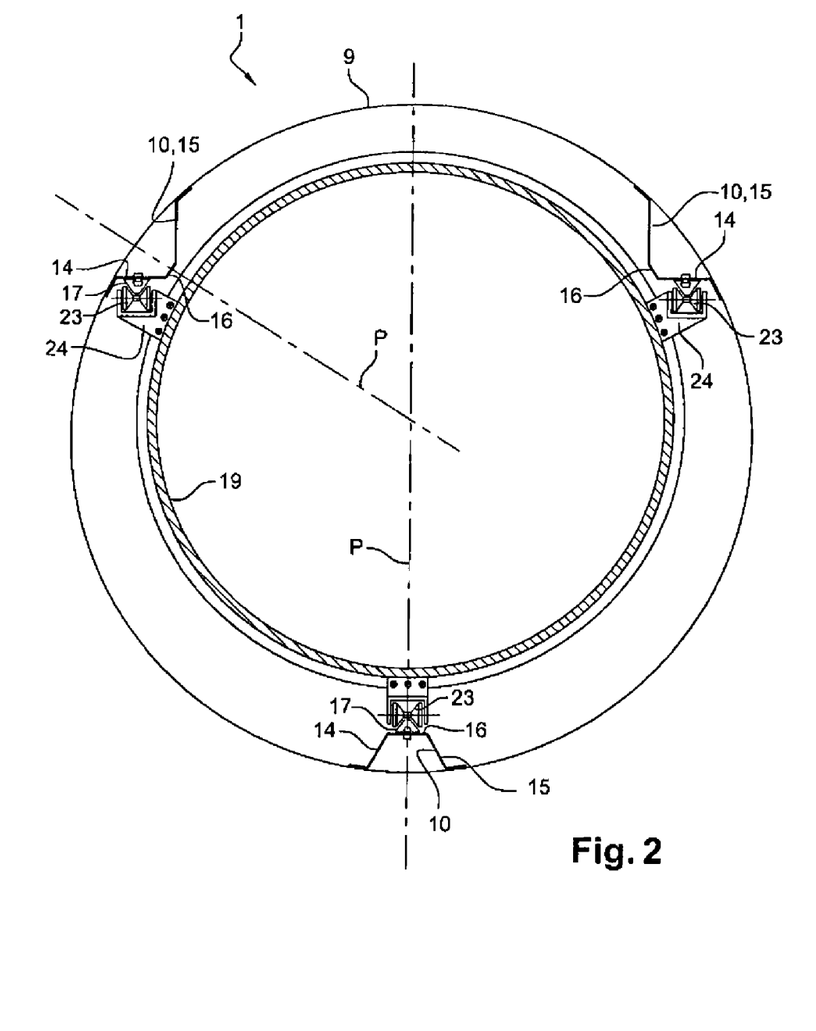
FIG. 2 is a transverse cross-sectional view, according to a first embodiment of the invention.

In the embodiment shown in FIG. 2, the nacelle is equipped with three beams 10, i.e. two beams arranged in the upper part of the nacelle 1 and a beam arranged in the lower part, at 6 o'clock.

Each beam 10 is equipped with a guide rail 17 assuming the form of a rectilinear hollow profile, with a generally triangular or trapezoidal section. On each of the upper beams 10, the rail is mounted at the downward-facing side face 14. The rail 17 equipping the lower beam 10 is mounted on the end wall 16 and thus extending in the radial plane P passing through the corresponding beam.

Figure 6:
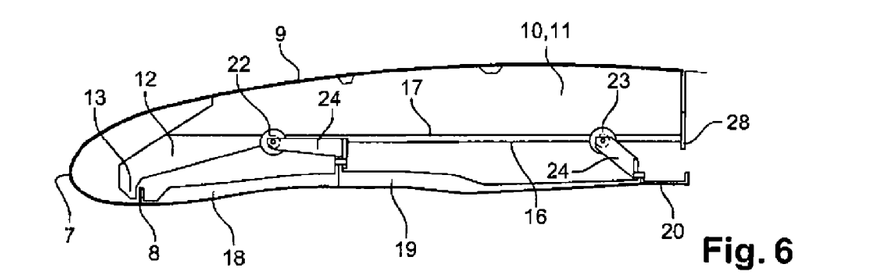
FIG. 6 is a partial view, in longitudinal cross-section, of the nacelle, in the operating position.
Figure 7:
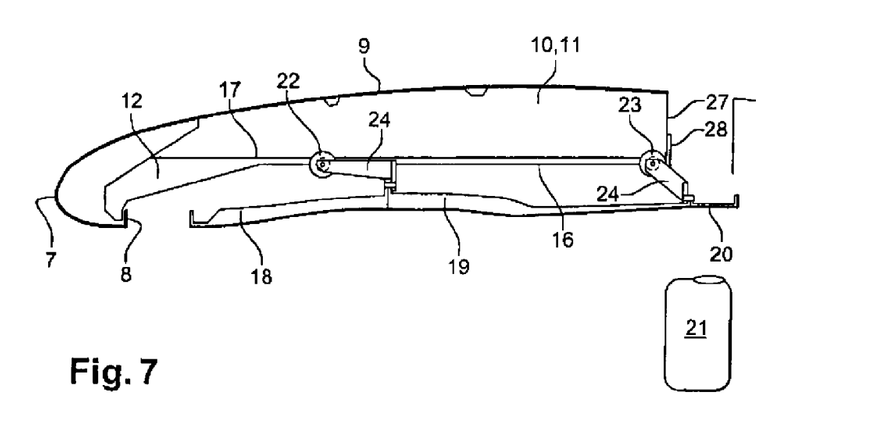
FIG. 7 is a view corresponding to FIG. 6, in the maintenance position of the nacelle.
Figure 8:
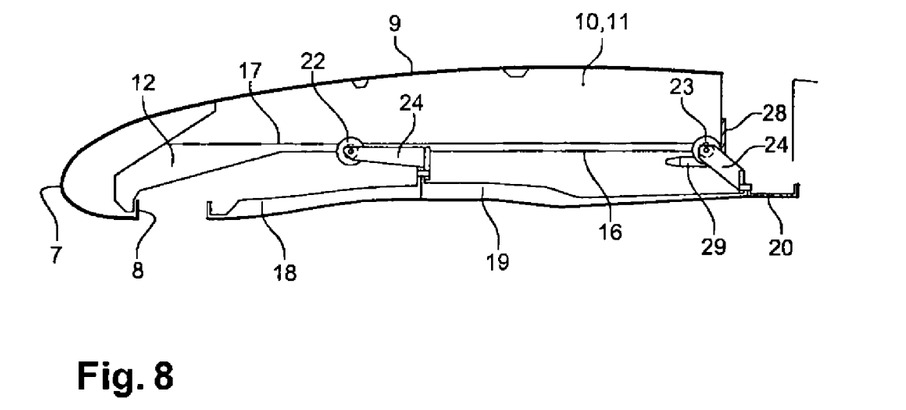
FIG. 8 is a view corresponding to FIG. 9, of an alternative embodiment.

In the diagrammatic views shown in FIGS. 6 to 8, only the contact line between the rail and the rollers is shown and designated by reference 17.

At least one inner panel 18 extends the inner edge 8 of the air intake lip 7. The inner panel 18 is intended to suitably channel the air towards the vanes (not shown) of the fan. Moreover, the inner panel 18 comprises an acoustic shroud intended to attenuate the noise annoyance due to the operation of the turbojet engine and the vibrations of the structure. The acoustic shroud can be formed by a honeycomb structure or any other structure making it possible to attenuate the noise annoyances.

Moreover, the middle structure 5 comprises a case, called fan case 19, and is attached to the air intake structure 4 so as to ensure aerodynamic continuity. More particularly, the inner panel 18 is fixed at its downstream end to an upstream end of the fan case 19, via fastening clips.

Furthermore, an intermediate case 20 is fastened downstream of the fan case using a clip, an oil reservoir 21 being mounted thereon.

Thus, the inner panel 18, the fan case 19 and the intermediate case 20 form an inner fixed structure.

The fan case 19 is also equipped with a plurality of rollers 22, 23 arranged opposite the rails 17.

In the embodiment illustrated in FIGS. 6 to 8, two rollers 22, 23 cooperate with each of the rails 17 of the upper beams 10.

A first roller 22, called upstream roller, is fastened to the fastening clip between the inner panel 18 and the fan case 19, via a fitting 24.

A second roller 23, hereafter called downstream roller and similar to the upstream roller, is mounted at the fastening clip between the fan case 19 and the intermediate case 20.

Figure 4:
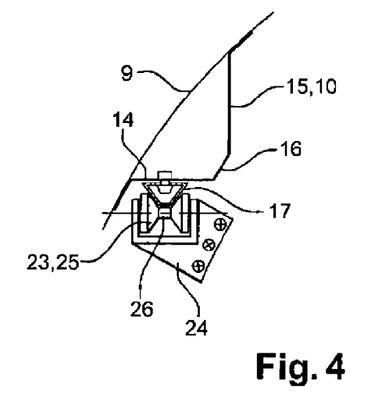
FIG. 4 is an enlarged view showing the guide means for guiding a beam and the corresponding complementary guide means of the inner structure.

Each roller 22, 23 is bobbin-shaped, having two tapered annular surfaces 25 connected by a cylindrical region 26, so as to form a generally V-shaped hollow (FIG. 4).

According to one alternative shown in FIG. 4, the rail 17 and the rollers 22, 23 are dimensioned so that the rail 17 is mounted without play in the V-shaped hollow of the rollers 22, 23, i.e. it is bearing against each of the tapered annular surfaces 25.

Figure 5:
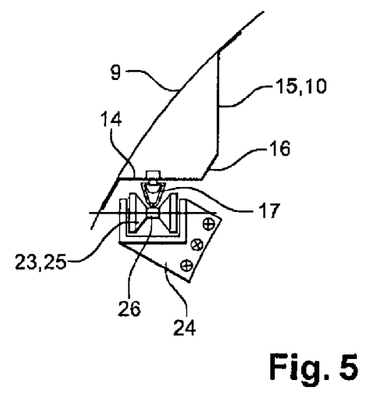
FIG. 5 is a view corresponding to FIG. 4, of an alternative embodiment of the invention.

According to another alternative shown in FIG. 5, the rail 17 and the rollers 22, 23 are dimensioned so that the rail 17 is mounted with play in the V-shaped hollow of the rollers 22, 23, i.e. it does not bear against each of the tapered annular surfaces 25, but against the cylindrical region 26.

It should be noted that the contact made in the example by a roller can be reproduced by a single pad.

As illustrated in FIG. 2, each beam 10 is equipped with a rail 17 and rollers 22, 23 with structures identical or similar to those presented above. The main difference lies in the fact that, as previously seen, in the case of upper beams 10, the guide means formed by the rollers 22, 23 and the rail 17 are offset from the radial plane P of the beam 10 so that the latter can extend as close as possible to the inner structure, i.e. the inner panel 18 or the fan case 19. Moreover, it is then not necessary to provide openings or recesses in the beams, as is the case in the prior art. In this way, the dimensions and therefore the inertia or rigidity of the beam are increased.

It should be noted that the upstream and downstream rollers of a same beam may not be aligned in a longitudinal plane, i.e. they can be offset from one another relative to a vertical plane, but also offset from one another relative to a horizontal plane.

Likewise, each rolling path may not be parallel relative to the axis of the nacelle.

Figure 9:
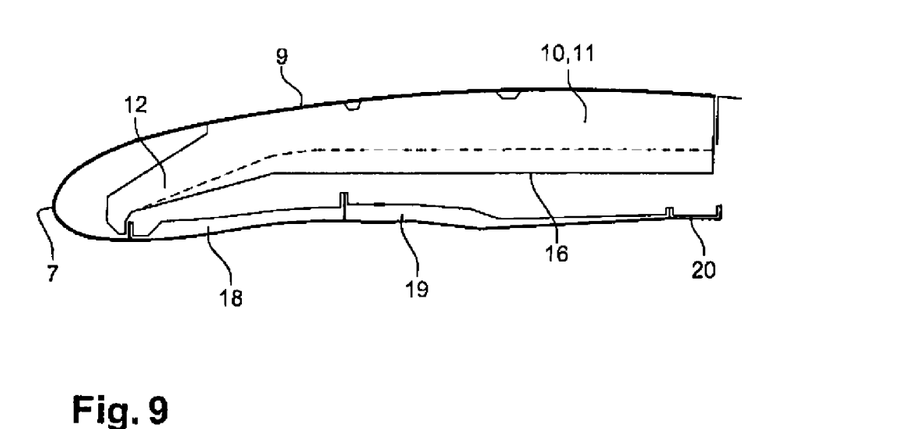
FIG. 9 is a view corresponding to the figure in which the guide means and the complementary guide means are not shown.

FIG. 9 diagrammatically shows, in dotted lines, the end wall 16 of a beam 10 in the case where the guide means were arranged in the radial plane P.

On the contrary, in the case of the lower beam 10, the rail 17 and the rollers 22, 23 are arranged in the corresponding middle plane P, so that the dimension of the beam 10 in that plane is reduced.

Figure 3:
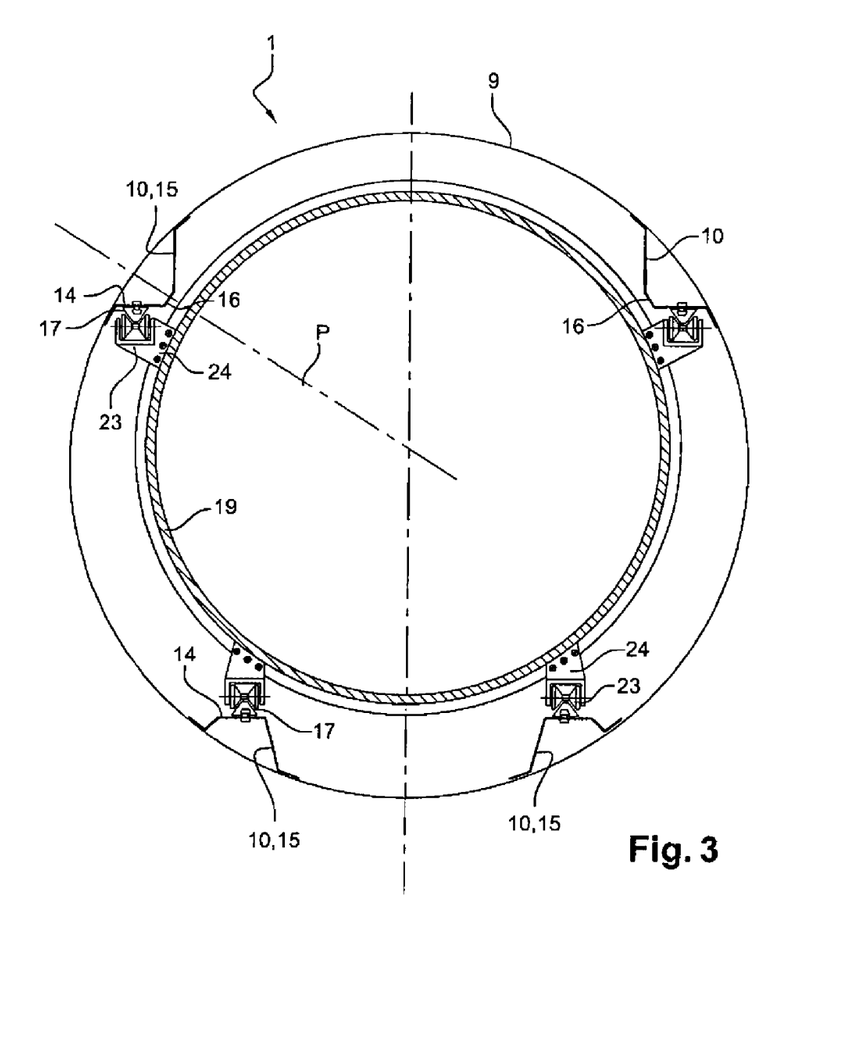
FIG. 3 is a view corresponding to FIG. 2, of a second embodiment of the invention.

Of course, an offset similar to that of the upper beams could be provided. This is for example considered in the embodiment of FIG. 3, in which the lower region of the nacelle 1 includes two beams 10, a rail 17 being mounted on each of the side faces 14 facing the top of the lower beams. In this way, each guide system formed by the rollers 22, 23 and the corresponding rail 17 is offset from the radial plane P of the beam 10.

The rails 17 and the rollers 22, 23 allow the movement and guiding of the outer structure relative to the inner structure, between an operating position, shown in FIG. 6, and a maintenance position, shown in FIG. 7. In this last position, the outer cowl 9 uncovers the intermediate case 20, so that it is possible to access the oil reservoir 21 from the outside. The current maintenance operation aiming to fill the oil reservoir 21 can therefore be performed by simply moving the outer structure in the maintenance position.

The structure of the rails 17 and the rollers 22, 23 also makes it possible to avoid a rotation of the outer structure around its longitudinal axis A. Moreover, the position of the upstream and downstream rollers 22, 23 is determined so as to prevent any tilting of the outer structure in the maintenance position. Such tilting is for example prevented by placing the upstream roller 22 upstream of the center of gravity of the outer structure 7, 9, 10.

The outer cowl 9 includes a downstream end face 27 (FIG. 7) equipped with at least one stop 28 protruding inwardly.

As visible in FIG. 7, each stop 28 bears against a downstream roller 23 or against a fitting connected to a downstream roller, in the maintenance position.

According to one possibility of the invention shown in FIG. 8, each stop 28 also forms a so-called "anti-slope" hook 29, each hook 29 being intended to grasp the corresponding downstream roller 23 or a retaining member connected thereto in the maintenance position. This embodiment aims to prevent any tilting of the mobile outer structure in the maintenance position, and is particular adapted to the case where it is not possible to arrange the upstream roller 22 upstream of the center of gravity.

When it is necessary to perform the placement operation to place the mobile outer structure 7, 9, 10, the stops or hooks 28, 29 are removed so as to allow the movement and guiding of the outer structure beyond its maintenance position, until complete removal thereof.

The return or placement of the outer structure on the fixed structure is facilitated since it is not necessary to ensure precise repositioning thereof relative to the fixed structure. In fact, the shape of the rollers 22, 23 and the rails 17 allows a slight offset or misalignment during this operation, the tapered walls 25 of the rollers 22, 23 and the shape of the rails 17 tending to automatically and correctly reposition the outer structure under the effect of its own weight after engagement of the rails 17 in the rollers 22, 23.

This phenomenon is even more pronounced if some of the rails 17 are mounted with play on the corresponding rollers 22, 23, as illustrated in FIG. 5.

Of course the invention is not limited solely to the embodiments of this turbojet engine nacelle described above as example, but on the contrary encompasses all alternatives.

The invention claimed is:

1. A turbojet engine nacelle comprising an outer structure including an annular lip defining an air inlet and a cowl extending as a continuation of the annular lip,
    an inner fixed structure extending as a continuation of the air inlet and including a region equipped with at least one piece of equipment requiring maintenance or monitoring,
    the outer structure being able to move in relation to the inner structure between an operating position in which the cowl covers the region equipped with the equipment, and a maintenance position in which the cowl reveals said region so as to allow access to the equipment from outside,
    the outer structure being equipped with at least one reinforcing beam designed to transmit loads between the annular lip and the cowl, said beam extending in a radial plane of the air inlet from the outer structure towards the inner structure,
    the beam comprising guide means capable of co-operating with complementary guide means belonging to the inner structure,
    wherein the guide means of the beam and the complementary guide means of the inner structure are offset relative to the radial continuation plane of the beam.

2. The nacelle (1) according to claim 1, wherein the inner structure includes a shroud, a case intended to surround a turbojet engine fan and arranged downstream of the shroud, as well as an intermediate case mounted downstream of the fan case, the intermediate case being provided with the equipment comprising an oil reservoir.

3. The nacelle according to claim 1, wherein the guide means and the complementary guide means respectively include at least one rail and at least one roller.

4. The nacelle according to claim 3, wherein the complementary guide means includes at least one generally bobbin-shaped roller, defining a hollow and generally V-shaped contact surface, the guide means including at least one rail inserted, at least in part, in a hollow formed by the contact surface.

5. The nacelle according to claim 1, wherein the at least one beam has a substantially omega-shaped section, forming first and second side walls attached to the outer structure and an end facing the inner structure, arranged in the radial continuation plane of the beam.

6. The nacelle according to claim 5, wherein the guide means is mounted on one of the first and second side walls of the beam.

7. The nacelle according to claim 1, wherein the at least one beam has a box-shaped structure.

8. The nacelle according to claim 1, further comprising at least first and second guide means or complementary guide means, spaced apart from each other along a longitudinal axis of the air inlet.

9. The nacelle according to claim 1, wherein the outer structure includes a stop intended to cooperate with a complementary stop of the inner structure in the maintenance position, so as to limit the movement of the outer structure relative to the inner structure.

10. The nacelle according to claim 9, wherein the stop is equipped with a hook, intended to engage with a retaining member mounted on the inner structure, in the maintenance position of the outer structure, so as to prevent the outer structure from tilting.

* * * * *